(12) United States Patent
Itagaki (10) Patent No.: US 6,983,152 B2
(45) Date of Patent: Jan. 3, 2006

(54) PORTABLE TELEPHONE SYSTEM CAPABLE OF SIMULTANEOUSLY CARRYING OUT HIGH SPEED COMMUNICATION AND LOW SPEED COMMUNICATION BY ONE TIME SLOT AND COMMUNICATION METHOD THEREFOR

(75) Inventor: Yoshio Itagaki, Tokyo (JP)

(73) Assignee: NEC Corporation, Tokyo (JP)

( * ) Notice: Subject to any disclaimer, the term of this patent is extended or adjusted under 35 U.S.C. 154(b) by 528 days.

(21) Appl. No.: 10/046,778

(22) Filed: Jan. 17, 2002

(65) Prior Publication Data

US 2002/0094818 A1    Jul. 18, 2002

(30) Foreign Application Priority Data

Jan. 17, 2001    (JP) .............................. 2001-008371

(51) Int. Cl.
*H04Q 7/20*    (2006.01)
(52) U.S. Cl. ............... 455/452.1; 455/450; 370/337
(58) Field of Classification Search ............... 455/450, 455/451, 452.1, 509, 422.1, 436; 370/337, 370/347, 348, 468, 344, 345
See application file for complete search history.

(56) References Cited

U.S. PATENT DOCUMENTS

| | | | | |
|---|---|---|---|---|
| 5,280,630 | A * | 1/1994 | Wang | 455/452.2 |
| 5,802,469 | A * | 9/1998 | Nounin et al. | 455/422.1 |
| 6,111,870 | A * | 8/2000 | Kurtz | 370/344 |
| 6,317,598 | B1 * | 11/2001 | Wiesen et al. | 455/443 |
| 6,532,364 | B1 * | 3/2003 | Uchida et al. | 455/436 |
| 6,539,010 | B1 * | 3/2003 | Hagerman et al. | 370/347 |

FOREIGN PATENT DOCUMENTS

| | | |
|---|---|---|
| JP | 6-205129 | 7/1994 |
| JP | 6-50523 | 12/1994 |
| JP | 9-200854 | 7/1997 |
| JP | 2000-13858 | 1/2000 |

* cited by examiner

*Primary Examiner*—Lee Nguyen
*Assistant Examiner*—Lewis West
(74) *Attorney, Agent, or Firm*—Young & Thompson

(57) ABSTRACT

In a portable telephone system including a base station and a mobile station which communicate with each other by using one time divisional time slot including a high speed channel and a low speed channel, a first communication requiring the high speed channel by a first calling party from the base station to the mobile station and a second communication not requiring the high speed channel by a second party from the base station to the mobile station are carried out simultaneously by using the high speed channel and the low speed channel, respectively.

17 Claims, 9 Drawing Sheets

PORTABLE TELEPHONE SYSTEM CAPABLE OF SIMULTANEOUSLY CARRYING OUT HIGH SPEED COMMUNICATION AND LOW SPEED COMMUNICATION BY ONE TIME SLOT AND COMMUNICATION METHOD THEREFOR

BACKGROUND OF THE INVENTION

1. Field of the Invention

The present invention relates to a portable telephone system such as a personal handyphone system (PHS), and more particularly, to the improvement of a speech communication and a data communication in a time division multiple access (TDMA) portable telephone system.

2. Description of the Related Art

A typical TDMA portable telephone system is a PHS.

A first prior art PHS including a base station and a mobile station (PHS terminal) carries out a communication by one time slot assigned thereto. That is, when a service is requested from the PHS terminal through a control channel to the base station, the base station determines a protocol for the service, so that either a speech communication or a conventional data communication is carried out by using an assigned time slot.

In the above-described first prior art PHS, however, since only one time slot is assigned to a speech communication or a conventional data communication, it is impossible for the PHS terminal to simultaneously carry out a speech communication and a conventional data communication. As a result, when a speech communication is requested while a conventional data communication is being carried out, this speech communication is rejected. On the other hand, when a conventional data communication is requested while a speech communication is being carried out, this conventional data communication is rejected.

A second prior art PHS carries out a speech communication and a conventional data communication by two time slots simultaneously (see: JP-A-2000-13858). That is, when a first service is requested from the PHS terminal through the control channel to the base station, the base station determines a protocol for the first service, so that the first service is carried out by using one assigned time slot. Next, while the first service is being carried out, when a second service is requested from the PHS terminal through the control channel to the base station, the base station determines a protocol for the second service, so that the second service is carried out by another assigned time slot.

In the above-described second prior art PHS, however, since a plurality of time slots are assigned to one PHS terminal, effective use is not made of time slots, i.e., channels. In other words, a large number of channels are consumed, so that other communication for the base station would be interrupted.

SUMMARY OF THE INVENTION

It is an object of the present invention to provide a portable telephone system simultaneously capable of a high speed communication such as a speech communication or a PHS Internet Access Forum Standard (PIAFS) data communication and a conventional data communication such as an i-mode data communication by using one time slot.

Another object is to provide a communication method for the above-mentioned portable telephone system.

Note that the PIAFS data communication as well as the speech communication requires a high speed communication. Also, a facsimile data communication may require a high speed communication. On the other hand, an "i-mode" data communication provided by NTT DoCoMo, Japan, which is a kind of Internet Browser service (Internet connection PHS service), does not require a high speed communication. Therefore, the conventional data communication includes such an i-mode data communication.

According to the present invention, in a portable telephone system including a base station and a mobile station which communicate with each other by using one time divisional time slot including a high speed channel and a low speed channel, a first communication requiring the high speed channel by a first calling party from the base station to the mobile station and a second communication not requiring the high speed channel by a second party from the base station to the mobile station are carried out simultaneously by using the high speed channel and the low speed channel, respectively.

Note that the low speed channel corresponds to the control channel of the prior art.

Also, in a communication method for a portable telephone system including a base station and a mobile station which communicate with each other by using one time divisional time slot including a high speed channel and a low speed channel, it is determined whether or not the high speed channel is empty, when a new service is requested from the base station to the mobile station using the low speed channel. Then, the new service is assigned to the high speed channel, when the high speed channel is empty.

Also, it is determined whether or not the low speed channel is empty, when the high speed channel is not empty. Then, it is determined whether the new service is related to a first communication which requires the high speed channel or a second communication not requiring the high speed channel, when the low speed channel is empty. Then, the new service is assigned to the low speed channel, when the new service is related to the second communication.

Further, the new service is assigned to no channel, when the low speed channel is not empty.

Additionally, it is determined whether a service occupying the high speed channel is a service relating to the first communication or a service relating to the second communication, when the new service is related to the first communication. Then, the service occupying the high speed channel is moved to the low speed channel, and the new service is assigned to the high speed channel, when the service occupying the high speed channel is a service relating to the second communication.

Further, the new service is assigned to no channel, when the service occupying the high speed channel is a service relating to the first communication.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
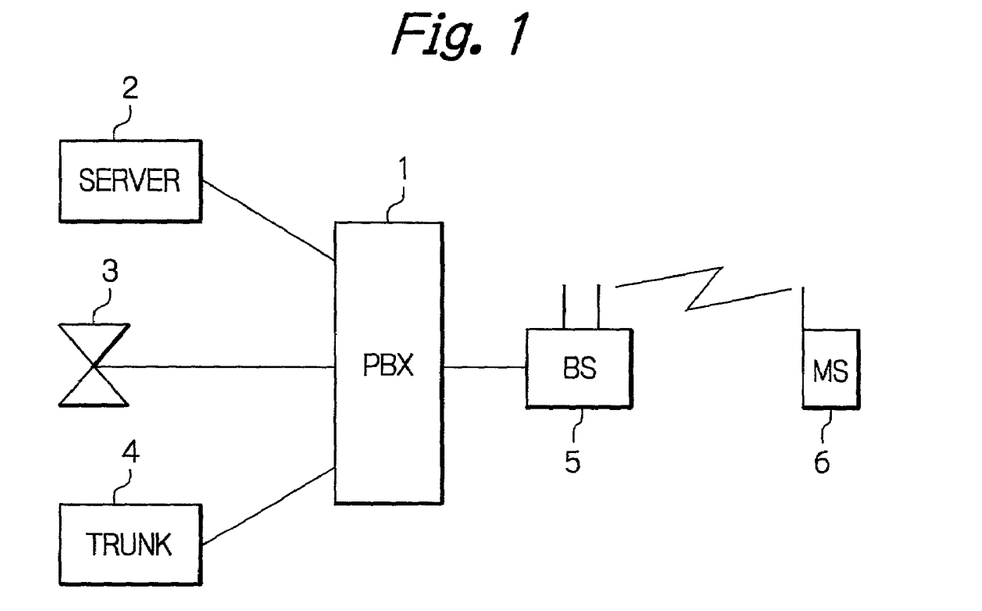
FIG. 1 is a block circuit diagram illustrating an embodiment of the portable telephone system according to the present invention.

In FIG. 1, which illustrates an embodiment of the portable telephone system according to the present invention, reference numeral 1 designates a private branch exchange connected to a server 2 for a conventional data communication such as an i-mode communication, a PIAFS data communication and a facsimile data communication, and an extension unit 3 and a trunk 4 for a speech communication. Also, a base station 5 is connected to the private branch exchange 1 to communicate with a mobile station 6.

Figure 2:
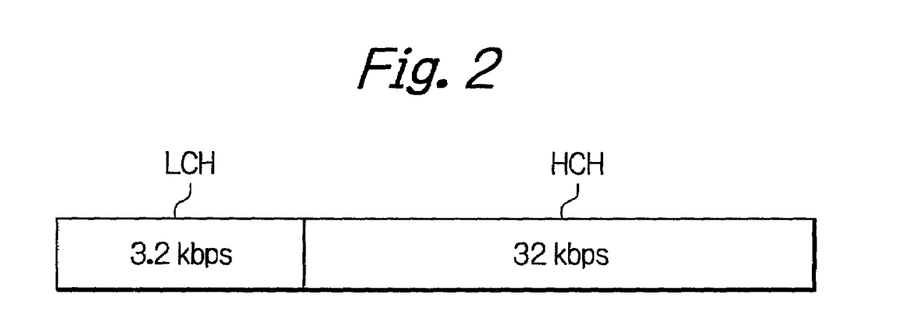
FIG. 2 is a diagram showing a time divisional time slot of a radio interface between the base station and the mobile station of FIG. 1.

As shown in FIG. 2, a radio interface between the base station 5 and the mobile station 6 is a time divisional time slot which includes a low speed channel LCH whose speed is 3.2 kbps, for example, and a high speed channel HCH whose speed is 32 kbps, for example.

The portable telephone system of FIG. 1 using the radio interface as shown in FIG. 2 can be applied to a conventional PHS system so that effective use is made of the. limited communication channel resource.

When a speech communication, a PIAFS data communication or a facsimile data communication is realized between the base station 5 and the mobile station 6, speech information, PIAFS data or facsimile data occupies the high speech channel HCH while control information is transmitted through the low speech channel LCH. In this case, since the control information transmitted through the low speech channel LCH is small, an empty channel would be generated in the band of the low speech channel LCH. In the present invention, effective use is made of such an empty channel in the band of the low speech channel LCH. That is, when a conventional data communication request such as an i-mode data communication request occurs while a speech communication, a PIAFS data communication or a facsimile data communication is being carried out, the conventional data communication is carried out through the empty band of the low speech channel LCH.

Figure 3:
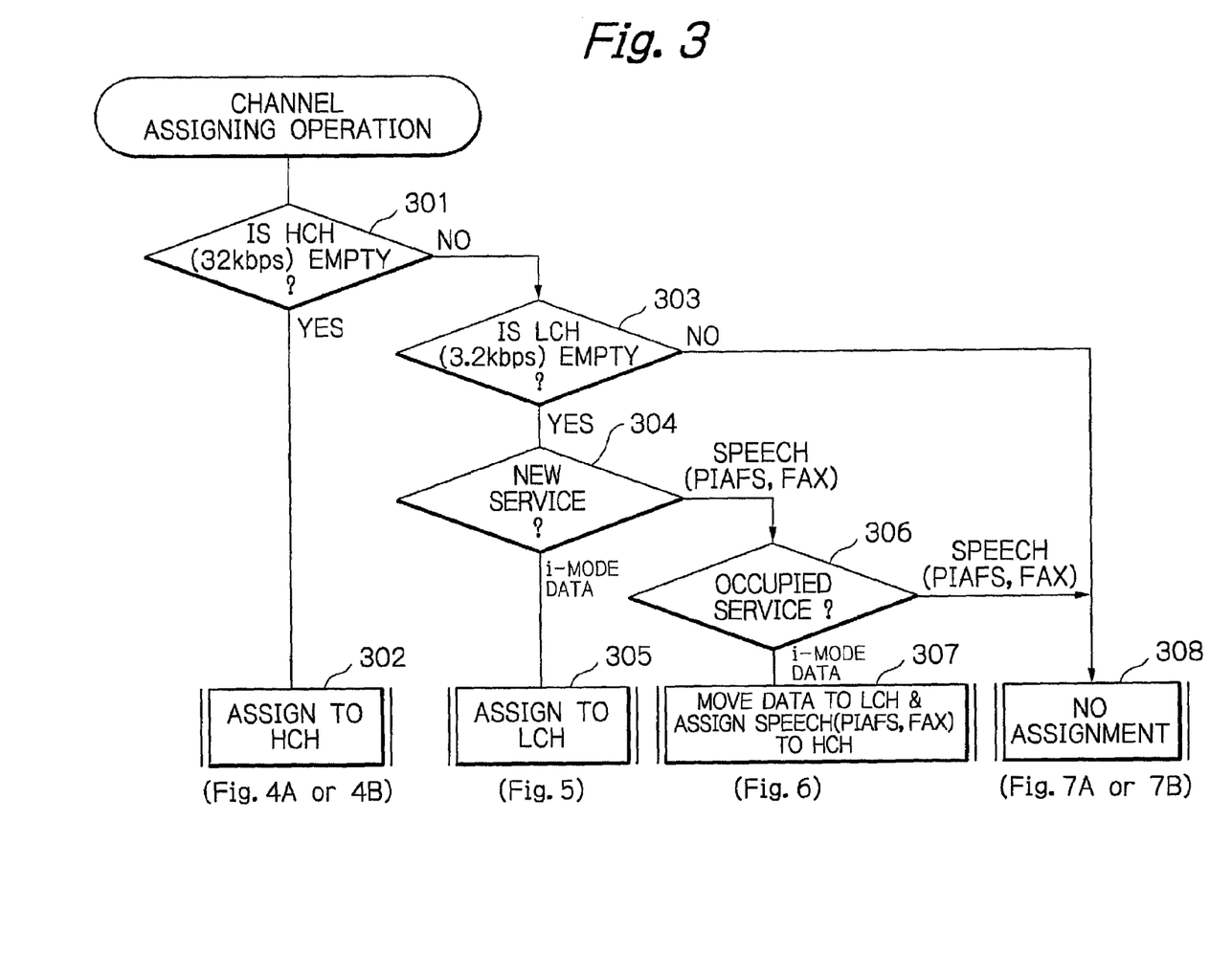
FIG. 3 is a flowchart for explaining the operation of the portable telephone system of FIG. 1.

The operation of the portable telephone system of FIG. 1 will be explained next with reference to FIG. 3, which is a flowchart for assigning a new service to a channel. The operation of FIG. 3 starts every time such a new service is requested for the mobile station 6.

First, at step 301, it is determined whether or not the high speed channel HCH is empty. Only when the high speed channel HCH is empty, does the control proceed to step 302 which assigns the new service to the high speed channel HCH. This will be explained later in detail with reference to FIGS. 4A and 4B. Otherwise, the control proceeds to step 303.

At step 303, it is determined whether or not the low speed channel LCH is empty. Only when the low speed channel LCH is empty, does the control proceed to step 304. Otherwise, the control proceeds to step 308 which assigns the new service to no channel. This will be explained later in detail with reference to FIG. 7A.

At step 304, it is determined whether or not the new service is a service relating to a speech communication (or a PIAFS data communication, a facsimile data communication) or a service relating to a conventional data communication such as an i-mode data communication. Only when the new service is a service relating to the conventional data communication, does the control proceed to step 305 which assigns the new service to the low speech channel LCH. This will be explained later in detail with reference to FIG. 5. Otherwise, i.e., when the new service is a service relating to a speech communication (or a PIAFS data communication, a facsimile data communication), the control proceeds to step 306.

At step 306, it is determined whether or not a speech communication (or a PIAFS data communication, a facsimile data communication) or a conventional data communication is already occupying the high speed channel HCH. Only when a conventional data communication is occupying the high speed channel HCH, does the control proceed to step 307 which moves the conventional data communication to the low speed channel LCH and assigns the new service to the high speed channel HCH. This will be explained later in detail with reference to FIG. 6. Otherwise, i.e., when a speech communication (or a PIAFS data communication, a facsimile data communication) is occupying the high speed channel HCH, the control proceeds to step 308 which assigns the new service to no channel. This will be explained later in detail with reference to FIG. 7B.

Figure 4A:
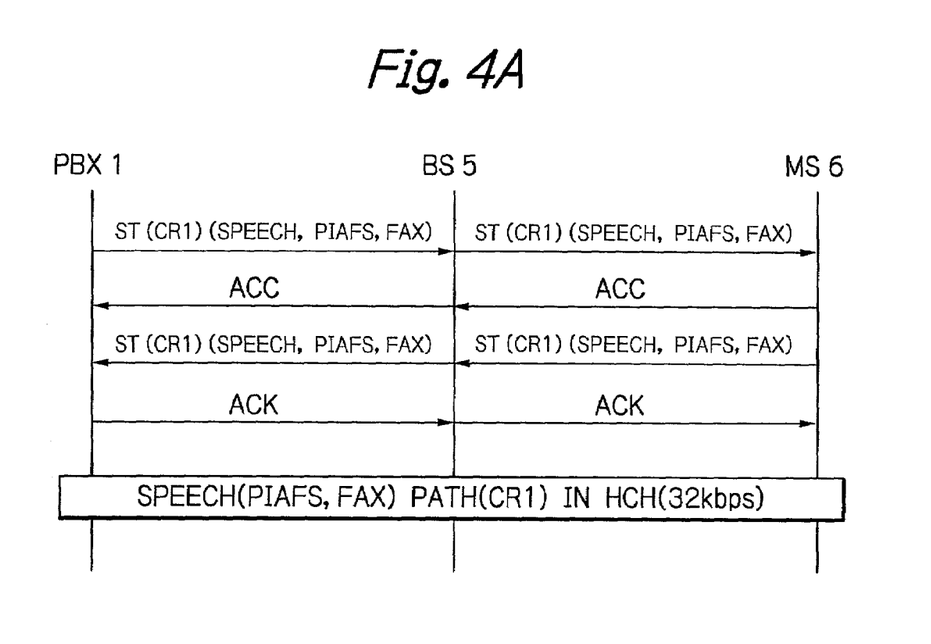
FIGS. 4A and 4B are sequence diagrams for explaing the operation of steps 301 and 302 of FIG. 3.

FIG. 4A is a sequence diagram for explaining the operation of steps 301 and 302 of FIG. 3. That is, when the high speed channel HCH is empty, it is assumed that a new service of a speech communication, a PIAFS data communication or a facsimile data communication is requested from the private branch exchange 1 to the mobile station 6.

First, a call set-up message ST having a call reference CR1 for a speech communication, a PIAFS data communication or a facsimile data communication is transmitted from the private branch exchange 1 via the base station 5 to the mobile station 6 using the low speed channel LCH. Since the high speed channel HCH is empty, the mobile station 6 transmits an acceptance message ACC via the base station 5 to the private branch exchange 1 using the low speed channel LCH. In this case, the mobile station 6 assigns the speech communication, the PIAFS data communication or the facsimile data communication having the call reference CR1 to the high speed channel HCH.

Next, the mobile station 6 transmits a call set-up message ST for the call reference CR1 via the base station 5 to the private branch exchange 1 using the low speed channel LCH. Then, the private branch exchange 1 generates an acknowledgement message ACK in response to the call set-up message ST for the call reference CR1.

Thus, a speech path, a PIAFS data path or a facsimile data path is established in the high speech channel HCH between the private branch exchange 1 and the mobile station 6.

Figure 4B:
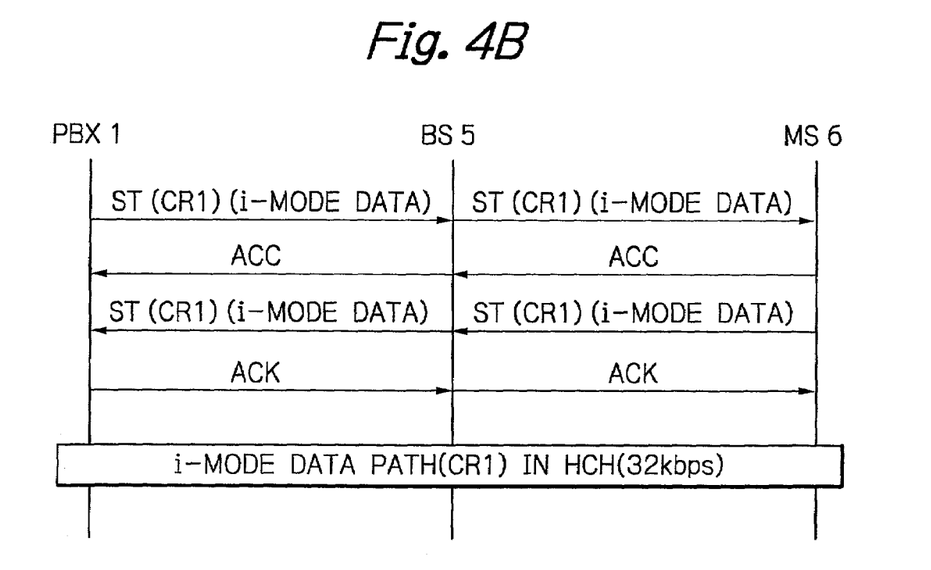

FIG. 4B is a sequence diagram for explaining the operation of steps 301 and 302 of FIG. 3. That is, when the high speed channel HCH is empty, it is assumed that a new service of a conventional data communication such as an i-mode data communication is requested from the private branch exchange 1 to the mobile station 6.

First, a call set-up message ST having a call reference CR1 for a conventional data communication is transmitted from the private branch exchange 1 via the base station 5 to the mobile station 6 using the low speed channel LCH. Since the high speed channel HCH is empty, the mobile station 6 transmits an acceptance message ACC via the base station 5 to the private branch exchange 1 using the low speed channel LCH. In this case, the mobile station 6 assigns the conventional data communication having the call reference CR1 to the high speed channel HCH.

Next, the mobile station 6 transmits a call set-up message ST for the call reference CR1 via the base station 5 to the private branch exchange 1 using the low speed channel LCH. Then, the private branch exchange 1 generates an acknowledgement message ACK in response to the call set-up message ST for the call reference CR1.

Thus, a conventional data path, i,e., an i-mode data path is established in the high speech channel HCH between the private branch exchange 1 and the mobile station 6.

Figure 5:
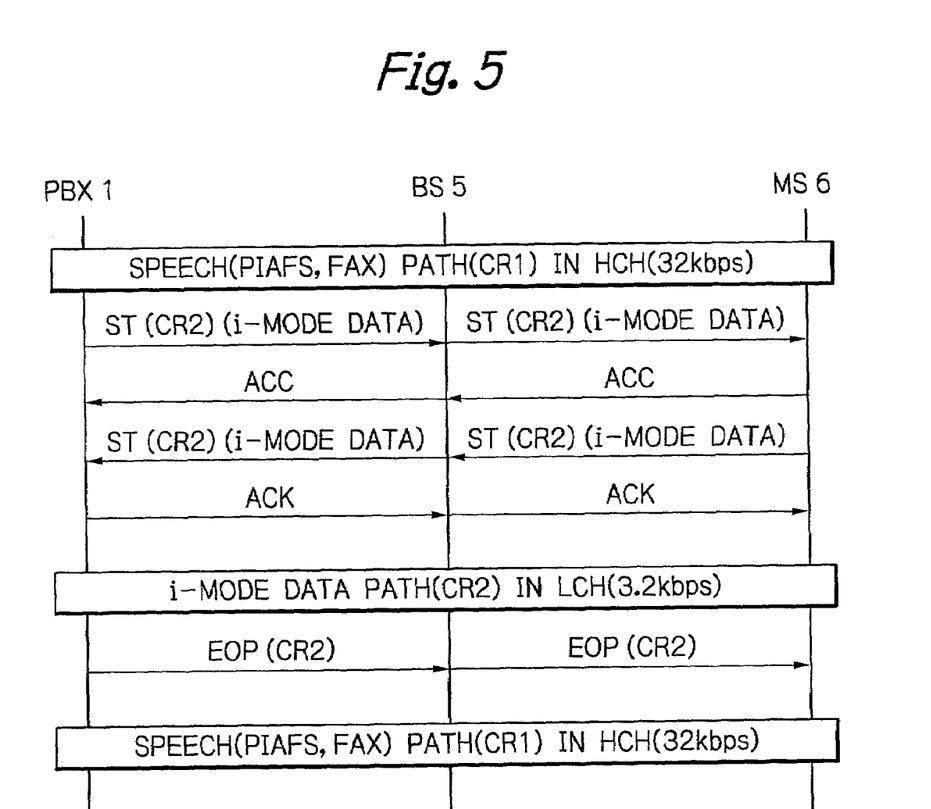
FIG. 5 is a sequence diagram for explaining the operation of steps 301, 303, 304 and 305 of FIG. 3.

FIG. 5 is a sequence diagram for explaining the operation of steps 301, 303, 304 and 305 of FIG. 3. That is, when the high speed channel HCH is occupied by a speech communication, a PIAFS data communication or a facsimile data communication having a call reference CR1 but the low speed channel LCH is empty, it is assumed that a new service of a conventional data communication such as an i-mode data communication is requested from the private branch exchange 1 to the mobile station 6.

First, a call set-up message ST having a call reference CR2 for a conventional data communication is transmitted from the private branch exchange 1 via the base station 5 to the mobile station 6 using the low speed channel LCH. Since the low speed channel LCH is empty, the mobile station 6 transmits an acceptance message ACC via the base station 5 to the private branch exchange 1 using the low speed channel LCH. In this case, the mobile station 6 assigns the conventional data communication having the call reference CR2 to the high speed channel HCH.

Next, the mobile station 6 transmits a call set-up message ST for the call reference CR2 via the base station 5 to the private branch exchange 1 using the low speed channel LCH. Then, the private branch exchange 1 generates an acknowledgement message ACK in response to the call set-up message ST for the call reference CR2.

Thus, a conventional data path, i.e., an i-mode data path is established in the low speech channel LCH between the private branch exchange 1 and the mobile station 6.

Next, after the conventional data communication is completed, the private branch exchange 1 generates an end of procedure (EOP) message for the call reference CR2 and transmits it via the base station 5 to the mobile station 6 using the low speed channel LCH. As a result, the conventional data path is dissolved, thus releasing the low speed channel LCH. Thus, only the speech path, the PIAFS data path or the facsimile data path remains in the high speed channel HCH between the private branch exchange 1 and the mobile station 6.

In FIG. 5, although the conventional data communication is completed while the speech communication, the PIAFS data communication or the facsimile data communication is being carried out, it is possible that the speech communication, the PIAFS data communication or the facsimile data communication is completed while the conventional data communication is being carried out.

Figure 6:
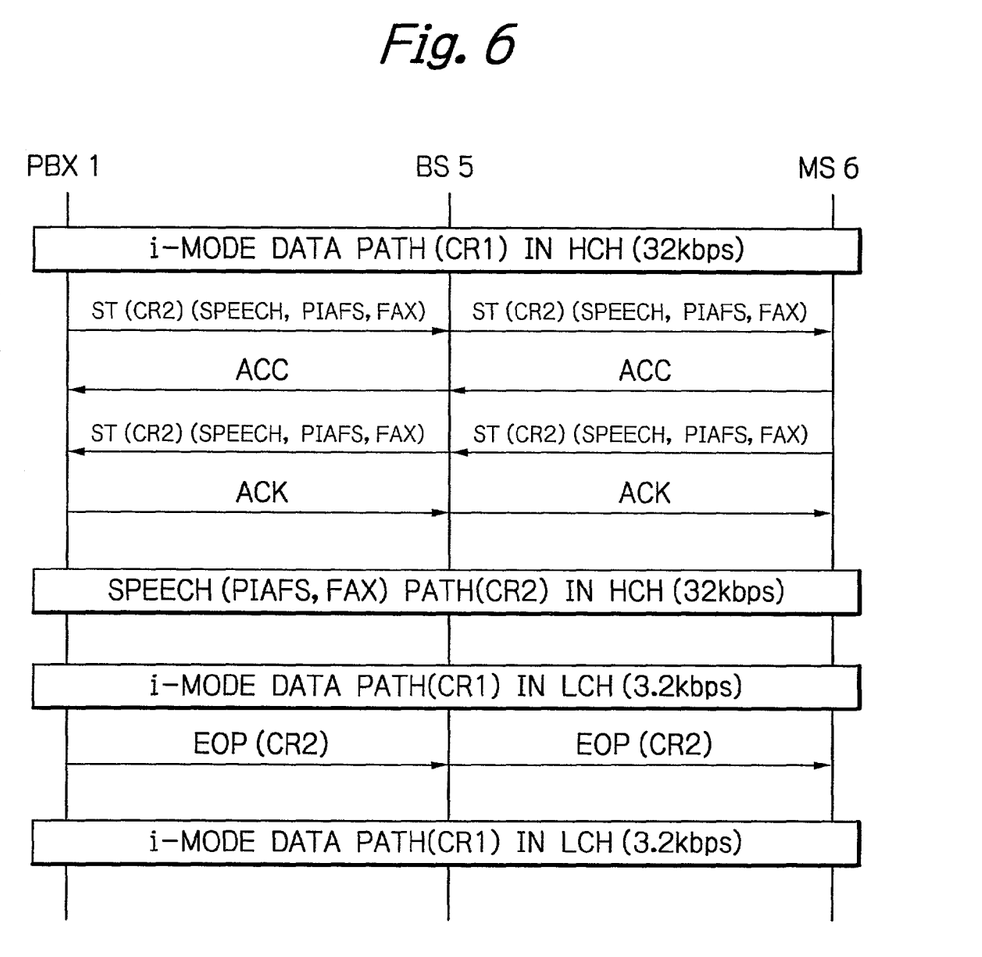
FIG. 6 is a sequence diagram for explaining the operation of steps 301, 303, 304, 306 and 307 of FIG. 3.

FIG. 6 is a sequence diagram for explaining the operation of steps 301, 303, 304, 306 and 307 of FIG. 3. That is, when the high speed channel HCH is occupied by a conventional data communication having a call reference CR1 but the low speed channel LCH is empty, it is assumed that a new service of a speech communication, a PIAFS data communication or a facsimile data communication is requested from the private branch exchange 1 to the mobile station 6.

First, a call set-up message ST having a call reference CR2 for a speech communication, a PIAFS data communication or a facsimile data communication is transmitted from the private branch exchange 1 via the base station 5 to the mobile station 6 using the low speed channel LCH. Since the low speed channel LCH is empty, the mobile station 6 moves the conventional data communication having the call reference CR1 to the low speed channel LCH. Then, the mobile station 6 transmits an acceptance message ACC via the base station 5 to the private branch exchange 1 using the low speed channel LCH. In this case, the mobile station 6 assigns the speech communication, the PIAFS data communication or the facsimile data communication having the call reference CR2 to the high speed channel HCH.

Next, the mobile station 6 transmits a call set-up message ST for the call reference CR2 via the base station 5 to the private branch exchange 1 using the low speed channel LCH. Then, the private branch exchange 1 generates an acknowledgement message ACK in response to the call set-up message ST for the call reference CR2.

Thus, a speech path, a PIAFS data path or a facsimile data path is established in the high speed channel HCH between the private branch exchange 1 and the mobile station 6, and a conventional data path, i.e., i-mode data path is established in the low speech channel LCH between the private branch exchange 1 and the mobile station 6.

Next, after the speech communication, the PIAFS data communication or the facsimile data communication is completed, the private branch exchange 1 generates an EOP message for the call reference CR2 and transmits it via the base station 5 to the mobile station 6 using the low speed channel LCH. As a result, the speech, PIAFS or facsimile data path is dissolved, thus releasing the high speed channel HCH. Thus, only the i-mode data path remains in the low speed channel LCH between the private branch exchange 1 and the mobile station 6.

In FIG. 6, although the conventional data communication is completed while the speech communication, the PIAFS data communication or the facsimile data communication is being carried out, it is possible that the speech communication, the PIAFS data communication or the facsimile data communication is completed while the conventional data communication is being carried out.

Figure 7A:
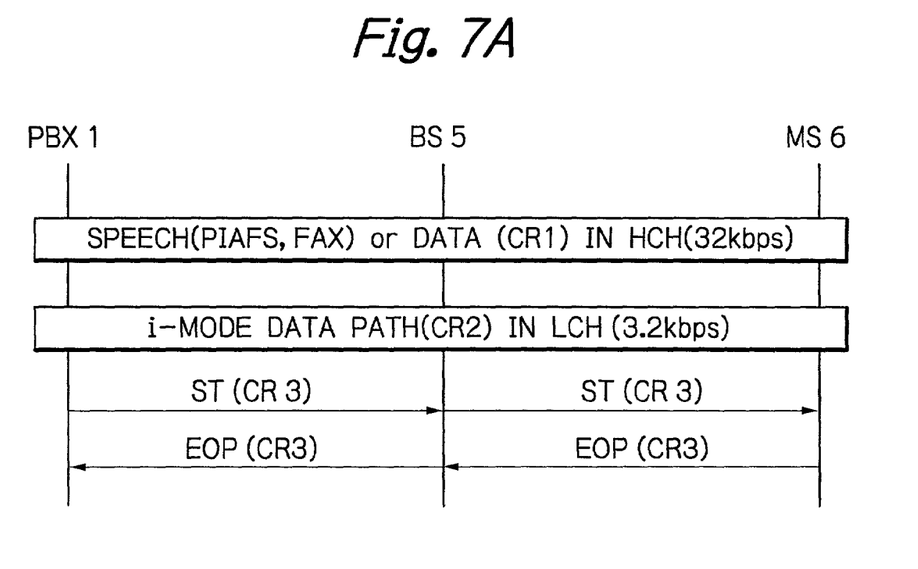
FIG. 7A is a sequence diagram for explaining the operation of steps 301, 303 and 308 of FIG. 3.

FIG. 7A is a sequence diagram for explaining the operation of steps 301, 303 and 308 of FIG. 3. That is, when the high speed channel HCH is occupied by a speech communication, a PIAFS data communication, a facsimile data communication or a conventional data communication having a call reference CR1, and the low speed channel LCH is occupied by a conventional data communication having a call reference CR2, it is assumed that a new service of one communication type is requested from the private branch exchange 1 to the mobile station 6.

First, a call set-up message ST having a call reference CR3 for the new service is transmitted from the private branch exchange 1 via the base station 5 to the mobile station 6 using the low speed channel LCH. Since the low speed channel LCH and the high speed channel HCH are both occupied, so that there is no available channel. Therefore, the mobile station 6 transmits an EOP message via the base station 5 to the private branch exchange 1 using the low speed channel LCH.

Thus, no new path is established between the private branch exchange 1 and the mobile station 6.

Figure 7B:
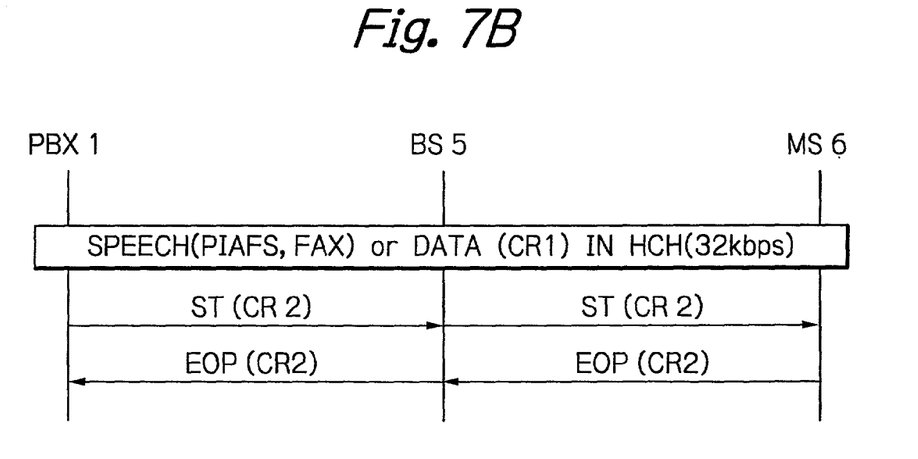
FIG. 7B is a sequence diagram for explaining the operation of steps 301, 303, 304, 306 and 308 of FIG. 3.

FIG. 7B is a sequence diagram for explaining the operation of steps 301, 303, 304, 306 and 308 of FIG. 3. That is, when the high speed channel HCH is occupied by a speech communication, a PIAFS data communication or a facsimile data communication having a call reference CR1 but the low speed channel LCH is empty, it is assumed that a new service of a speech communication, a PIAFS data communication or a facsimile data communication is requested from the private branch exchange 1 to the mobile station 6.

First, a call set-up message ST having a call reference CR2 for a speech communication, a PIAFS data communication or a facsimile data communication is transmitted from the private branch exchange 1 via the base station 5 to the mobile station 6 using the low speed channel LCH. Since the high speed channel HCH is already occupied by a speech communication, a PIAFS data communication a facsimile data communication, it is impossible for another speech communication, another PIAFS data communication or another facsimile data communication to occupy the high speed channel HCH. Therefore, the mobile station 6 transmits an EOP message via the base station 5 to the private branch exchange 1 using the low speed channel LCH.

Thus, no new path is established between the private branch exchange 1 and the mobile station 6.

According to the above-described embodiment, the mobile station 6 can carry out a speech communication (or a PIAFS data communication, a facsimile data communication) with a party and a conventional data communication such as an i-mode data communication with another party simultaneously. Therefore, when a conventional data communication is requested while a speech communication (or a PIAFS data communication, a facsimile data communication) is being carried out, the conventional data communication can be carried out without interrupting the speech communication (or the PIAFS data communication, the facsimile data communication), thus improving the operativity and reducing the time consumption. Similarly, when a speech communication (or a PIAFS data communication, a facsimile data communication) is requested while a conventional data communication is being carried out, the speech communication (or the PIAFS data communication, the facsimile data communication) can be carried out without interrupting the conventional data communication, thus improving the operativity and reducing the time consumption.

Also, since a conventional data communication is carried out through the empty band of the low speed channel LCH, effective use is made of the channel resource. For example, when a conventional data communication is requested while a speech communication, a PIAFS communication or a facsimile data communication is being carried out, the communication being blocked by the channel resource never occurs.

Figure 8:
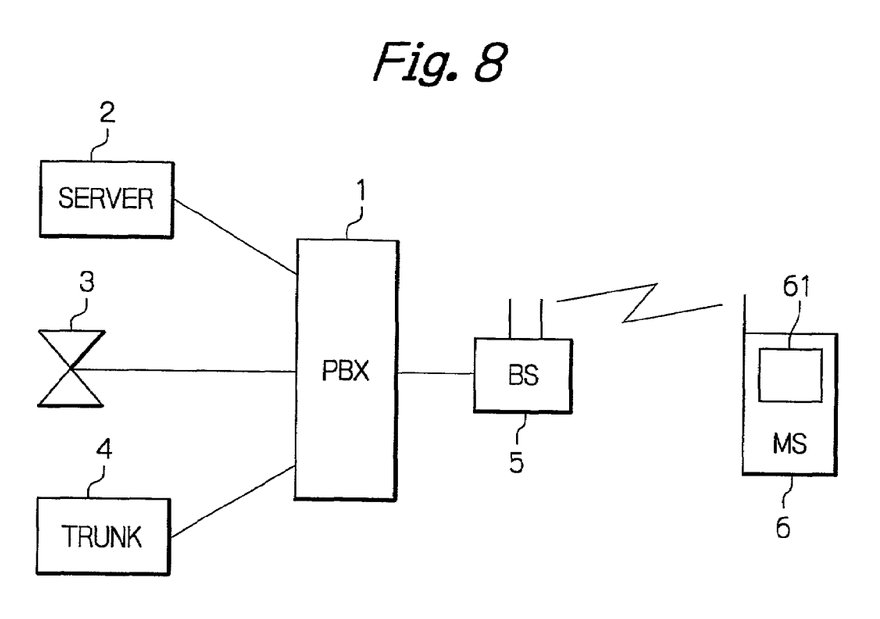
FIG. 8 is a block circuit diagram illustrating a modification of the portable telephone system of FIG. 1.

In FIG. 8, which illustrates a modification of the portable telephone system of FIG. 1, a display unit 61 is provided in the mobile station 6, thus accessing short messages and E-mails stored in the server 2 and the Internet via the server 2. In this case, the conventional data communication includes the access of such short messages E-mails and the Internet.

Figure 9:
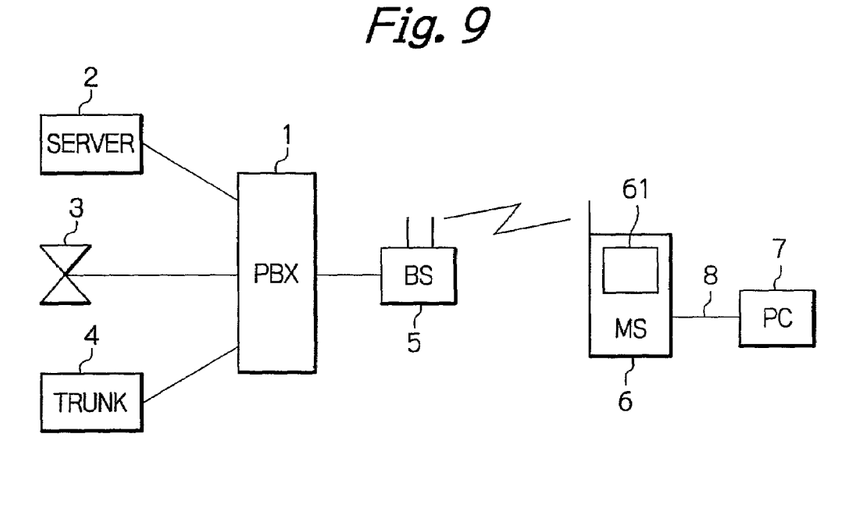
FIG. 9 is a block circuit diagram illustrating a modification of the portable telephone system of FIG. 8.

In FIG. 9, which illustrates a modification of the portable telephone system of FIG. 8, the movible station 6 is connected by a PIAFS cable to a personal computer 7, thus carrying out a PIAFS data communication by the personal computer 7 in addition to the mobile station 6 per se.

Figure 10:
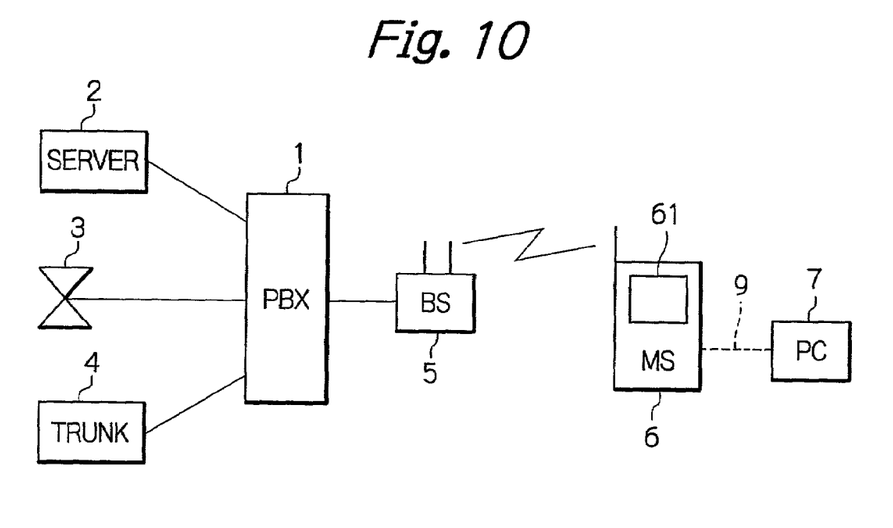
FIG. 10 is a block circuit diagram illustrating a modification of the portable telephone system of FIG. 9.

In FIG. 10, which illustrates a modification of the portable telephone system of FIG. 9, the connection between the mobile station 6 and the personal computer 7 is carried out by a radio interface 9 such as an Infrared Data Association (IrDA) interface or a Bluetooth interface.

The present invention can be applied to portable telephone systems other than the PHS.

As explained hereinabove, according to the present invention, the mobile station can carry out a speech communication (or a PIAFS data communication, a facsimile data communication) and a conventional data communication such as an Internet connection PHS data communication simultaneously.

What is claimed is:

1. A portable telephone system including a base station and a mobile station which communicate with each other by using one time divisional time slot including a high speed channel and a low speed channel, wherein a first communication requiring said high speed channel by a first calling party from said base station to said mobile station and a second communication not requiring said high speed channel by a second party from said base station to said mobile station are carried out simultaneously by using said high speed channel and said low speed channel, respectively, said base station comprising:
   means determining whether or not said high speed channel is empty, when a new service is requested from said base station to said mobile station using said low speed channel;
   means assigning said new service to said high speed channel, when said high speed channel is empty;
   means determining whether or not said low speed channel is empty, when said high speed channel is not empty;
   means determining whether said new service is related to a first communication which requires said high speed channel or a second communication not requiring said high speed channel, when said low speed channel is empty; and
   means assigning said new service to said low speed channel, when said new service is related to said second communication.

2. The system as set forth in claim 1, wherein said first communication is a speech communication.

3. The system as set forth in claim 1, wherein said first communication is a personal handyphone system Internet Access Forum Standard (PIAFS) data communication.

4. The system as set forth in claim 1, wherein said first communication is a facsimile data communication.

5. The system as set forth in claim 1, wherein said second communication is an Internet Browser service data communication.

6. The system as set forth in claim 1, wherein said high speed channel has a band width of 32 kbps and said low speed channel has a band width of 3.2 kbps.

7. The system as set forth in claim 1, being a personal handyphone system (PHS).

8. A communication method for a portable telephone system including a base station and a mobile station which communicate with each other by using one time divisional time slot including a high speed channel and a low speed channel, comprising the steps of:
   determining whether or not said high speed channel is empty, when a new service is requested from said base station to said mobile station using said low speed channel;

assigning said new service to said high speed channel, when said high speed channel is empty;

determining whether or not said low speed channel is empty, when said high speed channel is not empty;

determining whether said new service is related to a first communication which requires said high speed channel or a second communication not requiring said high speed channel, when said low speed channel is empty; and assigning said new service to said low speed channel, when said new service is related to said second communication.

9. The method as set forth in claim 8, further comprising a step of assigning said new service to no channel, when said low speed channel is not empty.

10. The method as set forth in claim 8, further comprising the steps of:

determining whether a service occupying said high speed channel is a service relating to said first communication or a service relating to said second communication, when said new service is related to said first communication; and moving the service occupying said high speed channel to said low speed channel and assigning said new service to said high speed channel, when the service occupying said high speed channel is a service relating to said second communication.

11. The method as set forth in claim 10, further comprising a step of assigning said new service to no channel, when the service occupying said high speed channel is a service relating to said first communication.

12. The method as set forth in claim 8, wherein said first communication is a speech communication.

13. The method as set forth in claim 8, wherein said first communication is a personal handyphone system Internet Access Forum Standard (PIAFS) data communication.

14. The system as set forth in claim 8, wherein said first communication is a facsimile data communication.

15. The method as set forth in claim 8, wherein said second communication is an Internet Browser service data communication.

16. The system as set forth in claim 8, wherein said high speed channel has a band width of 32 kbps and said low speed channel has a band width of 3.2 kbps.

17. The method as set forth in claim 8, wherein said system is a personal handyphone system (PHS).

* * * * *